United States Patent
Sato (10) Patent No.: US 8,401,817 B2
(45) Date of Patent: Mar. 19, 2013

(54) VELOCITY DETECTION DEVICE AND SERVOMOTOR

(75) Inventor: Shouichi Sato, Izunokuni (JP)

(73) Assignee: Toshiba Kikai Kabushi Kaisha, Tokyo (JP)

( * ) Notice: Subject to any disclaimer, the term of this patent is extended or adjusted under 35 U.S.C. 154(b) by 205 days.

(21) Appl. No.: 12/989,563

(22) PCT Filed: May 11, 2009

(86) PCT No.: PCT/JP2009/058739
§ 371 (c)(1),
(2), (4) Date: Oct. 25, 2010

(87) PCT Pub. No.: WO2009/142118
PCT Pub. Date: Nov. 26, 2009

(65) Prior Publication Data
US 2011/0040522 A1    Feb. 17, 2011

(30) Foreign Application Priority Data

May 22, 2008    (JP) .................................. 2008-134559

(51) Int. Cl.
G01C 9/00    (2006.01)
G11B 15/46    (2006.01)
G01P 21/00    (2006.01)

(52) U.S. Cl. ........................ 702/151; 360/73.01; 73/1.37

(58) Field of Classification Search .................. 702/151, 702/33–36, 41, 57, 81, 84, 127, 142, 145, 702/147, 150, 182–183, 189; 73/1.37, 1.41, 73/1.75, 1.79, 488–489, 491; 360/73.01; 33/1 M, 1 N, 1 SP, 1 PT, 1 AP, 503, 534, 33/536

See application file for complete search history.

(56) References Cited

U.S. PATENT DOCUMENTS 5,752,092 A    5/1998    Ohishi et al.
6,591,217 B1    7/2003    Baur et al.
(Continued)

FOREIGN PATENT DOCUMENTS

DE    10 2006 039 176    5/2007
JP    62-211505    9/1987
(Continued)

OTHER PUBLICATIONS

Sakai et al., A Servo Method for a Large-Capacity Floppy Disk Drive with Downward Compatibility, Sep. 1989, IEEE Transactions on Magnetics, vol. 25, No. 5, pp. 3375-3377.*

(Continued)

Primary Examiner — Toan M Le
(74) Attorney, Agent, or Firm — DLA Piper LLP (US)

(57) ABSTRACT

A velocity detection device includes a rotational direction discriminator calculating an x coordinate or a y coordinate in temporary coordinates on a line between an origin of the coordinates and a point obtained by rotating the actual second coordinates by as much as a rotational angle θ in a direction of a coordinate axis, the rotational direction discriminator discriminating a rotational direction from the actual first coordinates to the actual second coordinates based on either a sign of the x or y coordinate in the temporary coordinates; and a processor calculating calculational second coordinates represented by a multiplication, addition or subtraction between the actual first coordinates and one of the trigonometric function values to make calculational second coordinates closer to the actual second coordinates, and calculating the velocity of the moving body based on the temporary angles corresponding to the trigonometric function value used for the calculational second coordinates.

6 Claims, 6 Drawing Sheets

U.S. PATENT DOCUMENTS

| | | |
|---|---|---|
| 7,064,538 B2 | 6/2006 | Kernhof |
| 7,606,852 B2 | 10/2009 | Maharatna et al. |
| 7,668,689 B2 | 2/2010 | Aono |
| 2004/0207392 A1 | 10/2004 | Kernhof |
| 2006/0145648 A1 | 7/2006 | Fujita et al. |
| 2007/0198200 A1 | 8/2007 | Aono |
| 2008/0111516 A1 | 5/2008 | Inokuma |

FOREIGN PATENT DOCUMENTS

| | | |
|---|---|---|
| JP | 2001-308943 | 11/2001 |
| JP | 2003-513229 | 4/2003 |
| JP | 2007-57269 | 3/2007 |
| KR | 1999-0085924 | 12/1999 |
| KR | 10-2006-0071895 | 6/2006 |
| WO | WO 01/11375 | 2/2001 |
| WO | WO 2005/073841 | 8/2005 |

OTHER PUBLICATIONS

International Preliminary Report on Parentability & Written Opinion issued in PCT/JP2009/058739 on Jan. 20, 2011.
Office Action issued in counterpart Korean Application No. 10-200678582, dated Aug. 23, 2007, accompanied by an English language translation.
English Translation of KR 1999-0085924 published Dec. 15, 1999.
Office Action issed in Japanese Appl 2005-240284 on Apr. 1, 2011.
English Translation of Office Action issued in Japanese Appl 2005-240284 on Apr. 1, 2011.
English Abstract of JP 2003-513229 published Apr. 8, 2003.
English Translation of JP 2003-513229 published Apr. 8, 2003.
Japanese Office Action issued in JP 2005-240284 mailed on Jun. 2, 2011.
English Translation of Japanese Office Action issued in JP 2005-240284 mailed on Jun. 2, 2011.
H. Sugimoto et al., "Fact of the Theory and Design for AC Servo-System", pp. 142-149 (1990).
English language translation of H. Sugimoto et al., "Fact of the Theory and Design for AC Servo-System", pp. 142-149 (1990).
Office Action issued in Korean Application 10-2007-124972 on Jul. 29, 2009.
English Language Translation of Office Action issued in Korean Application 10-2007-124972 on Jul. 29, 2009.
English Language Abstract of JP 2006-201148 Published Aug. 3, 2006 (corresponds to KR 10-2006-0071895 published Jun. 27, 2006).
English Language Translation of Office Action issued in German Appl 10 2007 057 476 on Nov. 16, 2009.
Office Action issued in German Appl 10 2007 057 476 on Nov. 16, 2009.
Duprat J., Muller J.-M: The CORDIC Algorithm: New Results fur Faist VLSI huplementation. In: IEEE Transactions on Computers, vol. 42, No. 2, Feb. 1993, S. 168-178.
Related U.S. Appl. No. 11/949,816.
German Office Action issued in DE 11 2009 000846 on Apr. 3, 2012.
English Language Translation of German Office Action issued in DE 11 2009 000846 on Apr. 3, 2012.
Abstract of DE 102006039176 with English Language Translation (see p. 2 of document), May 16, 2012.
International Search Report issued in PCT/JP2009/058739 on Aug. 11, 2009.
English Abstract of JP 2007-57269 published Mar. 8, 2007.
English Translation of JP 2007-57269 published Mar. 8, 2007.
English Abstract of JP 62-211505 published Sep. 17, 1987.
Related U.S. Appl. No. 11/465,382.
Japanese Office Action issued in JP 2008-134559 on Jun. 29, 2012.
English Language Translation of Japanese Office Action issued in JP 2008-134559 on Jun. 29, 2012.
English Language Abstract of JP 2001-308943 published on Nov. 2, 2001.
English Language Translation of JP 2001-308943 published on Nov. 2, 2001.

* cited by examiner

VELOCITY DETECTION DEVICE AND SERVOMOTOR

FIELD OF THE INVENTION

The present invention relates to a velocity detection device and a servomotor.

RELATED ART

In motion control by a servomotor, a position detector outputs SIN and COS signals based on a moving distance of a machine or a moving angle of an axis thereof. An arithmetic circuit of the position detector samples the SIN and COS signals for every unit time and calculates a moving velocity or an angular velocity based on a distance difference or an angular difference between two samples and a time interval between two samplings.

Figure 7A:
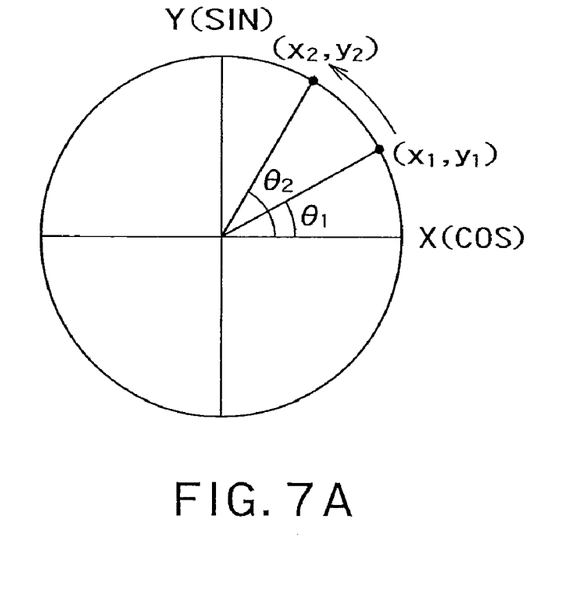
FIGS. 7A and 7B show coordinates obtained by two samplings.
Figure 7B:
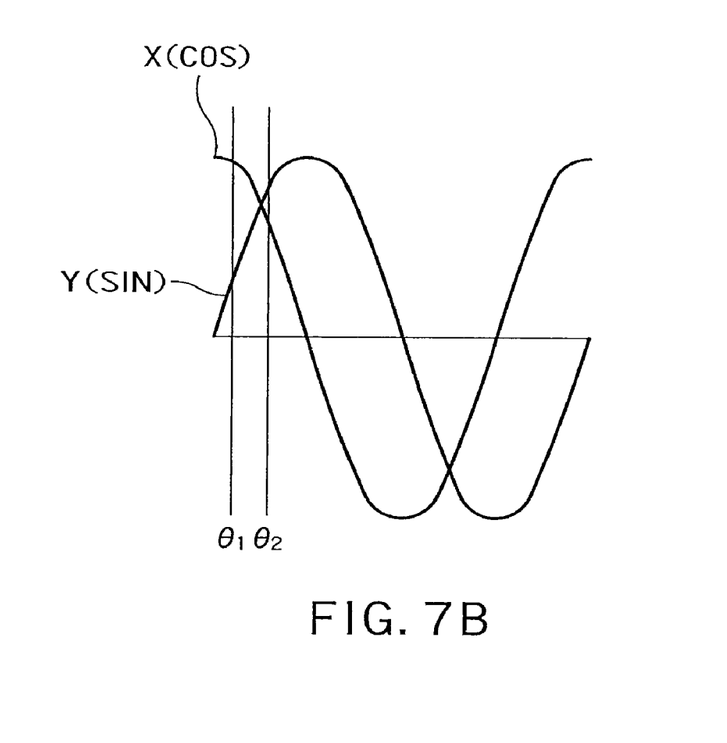

For example, as shown in FIGS. 7A and 7B, assuming that coordinates obtained by two samplings are (x1, y1) and (x2, y2) and that a sampling time interval is t(sec), an angular velocity $\omega$(rad/sec) can be expressed by the following Equation (1).

$$\omega = (\theta 2 - \theta 1)/t = (\tan^{-1}(y2/x2) - \tan^{-1}(y1/x1))/t \quad \text{(Equation 1)}$$

In the Equation (1), $\theta 1$(rad) and $\theta 2$(rad) are absolute angles (amplitudes) at timings of the two samplings, respectively. As shown in the Equation (1), it is required to calculate the amplitudes from the coordinates so as to obtain the angular velocity $\omega$.

To address this problem, it is considered to use a CPU or a custom LSI (Large-Scale Integrated Circuit) as the arithmetic circuit and to realize a calculation of the Equation (1) by a digital logic circuit.

Nevertheless, arc tangent ($\tan^{-1}$) necessitates a division of sin/cos. To calculate the arc tangent, there are two problems as follows. First, when a cos signal nears 0 on a unit circle, an absolute value of tangent (sin÷cos) is quite high. This results in quite a large error in a result of the arc tangent.

Second, it is necessary to do division (sin÷cos) so as to obtain the arc tangent and the tangent. The division is difficult to realize in a digital circuit. To realize the division, it is necessary to use a far larger-scale digital circuit than those for multiplication and addition.

Furthermore, a ripple or noise that occurs to a power supply voltage often causes a fluctuation in the SIN and COS signals in actual operations. In this case, a velocity detection device possibly erroneously detects a moving velocity or an angular velocity of a moving body.

Therefore, it is an object of the present invention to provide a velocity detection device and a servomotor capable of highly accurately detecting a moving velocity or an angular velocity of a moving body using a small-scale arithmetic circuit even if a ripple or noise occurs to a power supply voltage.

SUMMARY OF THE INVENTION

A velocity detection device for periodically sampling coordinates indicating a position of a moving body making a rotational motion or a reciprocating motion, and for detecting a velocity of the moving body based on the coordinates, according to an embodiment of the present invention comprises:

a memory storing a plurality of preset temporary angles and trigonometric function values corresponding to the temporary angles, respectively;

a first register storing actual first coordinates of the moving body, the actual first coordinates being obtained by a first sampling;

a second register storing actual second coordinates of the moving body, the actual second coordinates being obtained by a second sampling next to the first sampling;

a rotational direction discriminator calculating at least either an x coordinate or a y coordinate in temporary coordinates on a line, which connects between an origin of the coordinates and a point obtained by rotating the actual second coordinates by as much as a rotational angle $\theta$ in a direction of a coordinate axis, the rotational direction discriminator discriminating a rotational direction from the actual first coordinates to the actual second coordinates based on either a sign of the x coordinate in the temporary coordinates or a sign of the y coordinate in the temporary coordinates, the origin of the coordinates being a center of rotation, and the a being the rotational angle from the actual first coordinates to the coordinate axis; and a processor calculating calculational second coordinates represented by multiplication, addition or subtraction between the actual first coordinates and one of the trigonometric function values in order to make the calculational second coordinates closer to the actual second coordinates based on the rotational direction, the processor calculating the velocity of the moving body based on one of the temporary angles corresponding to the trigonometric function value used for the calculational second coordinates, wherein the rotational direction discriminator calculates at least either an x coordinate or a y coordinate in temporary coordinates on a line, which connects between the origin of the coordinates and a point obtained by rotating the actual second coordinates by as much as a rotational angle $\beta$ in the direction of the coordinate axis, the rotational direction discriminator discriminates a rotational direction from the calculational second coordinates to the actual second coordinates based on either a sign of the x coordinate in the temporary coordinates or a sign of the y coordinate in the temporary coordinates, the origin of the coordinates is the center of rotation, and the $\beta$ is the rotational angle from the calculational second coordinates to the coordinate axis.

A servo motor for periodically sampling coordinates indicating a position of a moving body making a rotational motion or a reciprocating motion, and for detecting a velocity of the moving body based on the coordinates, according to an embodiment of the present invention comprises:

a memory storing a plurality of preset temporary angles and trigonometric function values corresponding to the temporary angles, respectively;

a first register storing actual first coordinates of the moving body, the actual first coordinates being obtained by a first sampling;

a second register storing actual second coordinates of the moving body, the actual second coordinates being obtained by a second sampling next to the first sampling;

a rotational direction discriminator calculating at least either an x coordinate or a y coordinate in temporary coordinates on a line, which connects between an origin of the coordinates and a point obtained by rotating the actual second coordinates by as much as a rotational angle $\theta$ in a direction of a coordinate axis, the rotational direction discriminator discriminating a rotational direction from the actual first coordinates to the actual second coordinates based on either a sign of the x coordinate in the temporary coordinates or a sign of the y coordinate in the temporary coordinates, the origin of the coordinates being a center of rotation, and the θ being the rotational angle from the actual first coordinates to the coordinate axis; and a processor calculating calculational second coordinates represented by multiplication, addition or subtraction between the actual first coordinates and one of the trigonometric function values in order to make the calculational second coordinates closer to the actual second coordinates based on the rotational direction, the processor calculating the velocity of the moving body based on one of the temporary angles corresponding to the trigonometric function value used for the calculational second coordinates, wherein the rotational direction discriminator calculates at least either an x coordinate or a y coordinate in temporary coordinates on a line, which connects between the origin of the coordinates and a point obtained by rotating the actual second coordinates by as much as a rotational angle β in the direction of the coordinate axis, the rotational direction discriminator discriminates a rotational direction from the calculational second coordinates to the actual second coordinates based on either a sign of the x coordinate in the temporary coordinates or a sign of the y coordinate in the temporary coordinates, the origin of the coordinates is the center of rotation, and the β is the rotational angle from the calculational second coordinates to the coordinate axis.

The present invention can provide a velocity detection device and a servomotor capable of highly accurately detecting a moving velocity or an angular velocity of a moving body using a small-scale arithmetic circuit even if a ripple or noise occurs to a power supply voltage.

DETAILED DESCRIPTION OF THE INVENTION

Embodiments of the present invention are explained with reference to the accompanying drawings. The present invention is not limited to the embodiments.

Figure 1:
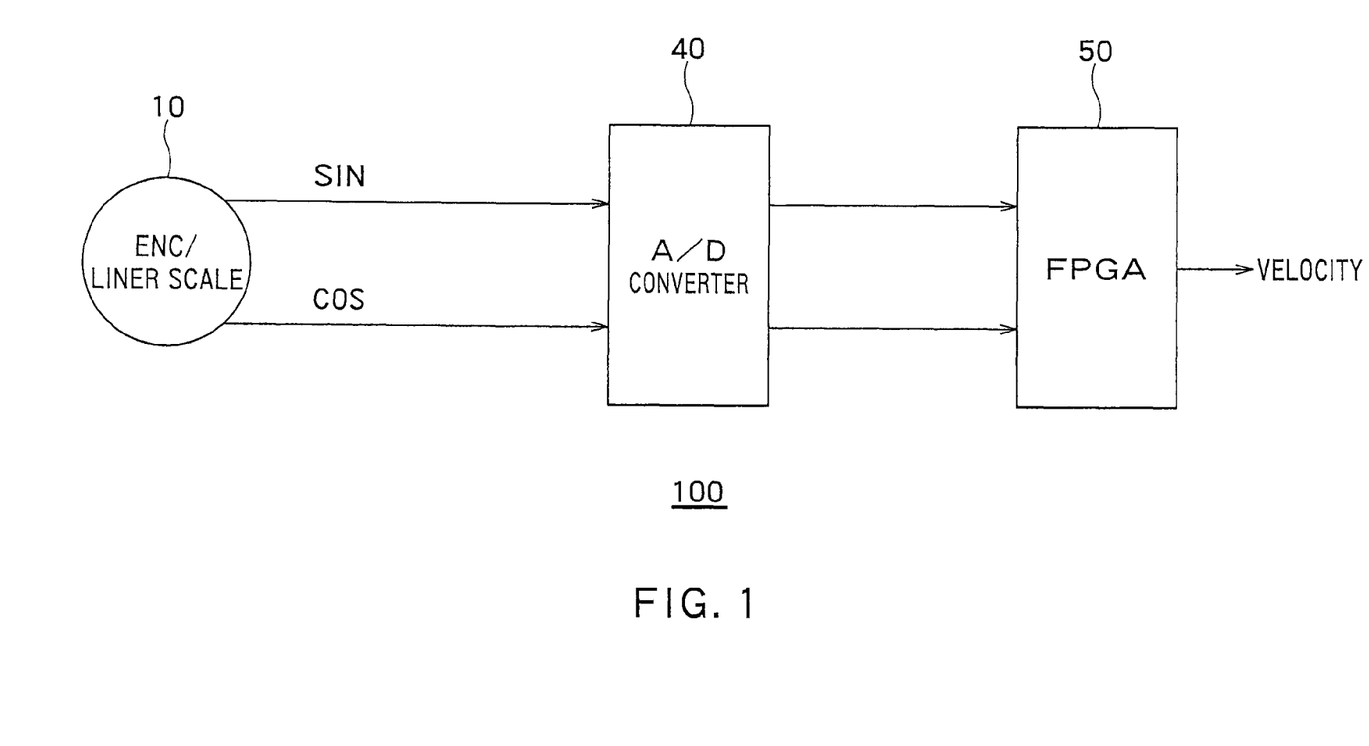
FIG. 1 is a block diagram of a velocity detection device 100 according to an embodiment of the present invention.

FIG. 1 is a block diagram of a velocity detection device 100 according to an embodiment of the present invention. The velocity detection device 100 includes a rotary encoder or a linear scale 10, an A/D converter 40, and an processor 50. The processor 50 is a general-purpose CPU or a custom LSI. The processor 50 can be, for example, an FPGA (Field Programmable Gate Array). The velocity detection device 100 can be provided in, for example, a servomotor that includes a moving body making a rotational motion or a reciprocating motion.

The moving body is, for example, a rotor or a reciprocating arm of the servomotor provided in a machine tool.

The rotary encoder or the linear scale 10 outputs signals (a SIN signal and a COS signal) of coordinates (sin, cos) indicating positions of the moving body making the rotational motion or reciprocating motion. The A/D converter 40 converts the SIN signal and the COS signal from the rotary encoder or the linear scale 10 into digital signals. The processor 50 receives digital signals based on the SIN signal and the COS signal, respectively from the A/D converter 40, and calculates an angular velocity or a velocity of the moving body.

While the FPGA can be used as the processor 50, another arbitrary LSI can be used in place of the FPGA. Alternatively, the processor 50 can be realized by a general-purpose CPU and software.

Figure 2:
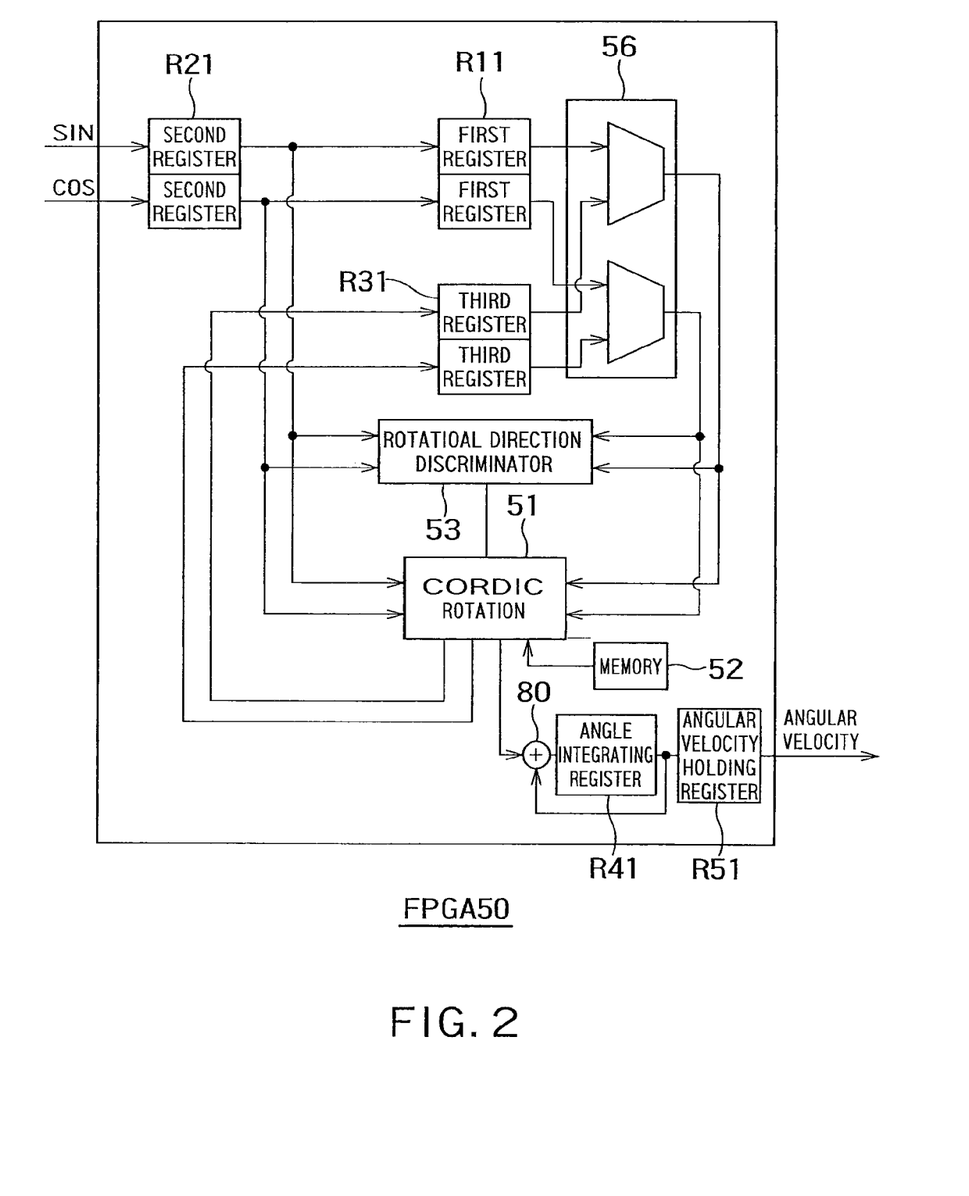
FIG. 2 is a block diagram showing an internal configuration of the processor 50.

FIG. 2 is a block diagram showing an internal configuration of the processor 50. The processor 50 includes a CORDIC rotation 51, a memory 52, a rotational direction discriminator 53, a selector 56, a first register R11, a second register R21, a third register R31, an angle integrating register R41 serving as a fourth register, an angular velocity holding register R51, and an adder 80.

A process of calculating the angular velocity from the SIN signal and the COS signal is explained with reference to FIG. 2. To calculate the angular velocity, a CORDIC (Coordinates Rotation Digital Computer) algorithm is used. The CORDIC algorithm includes a vectoring mode and a rotation mode. In the present embodiment, the processor 50 uses the rotation mode. This CORDIC algorithm is included in the processor 50 and realized by a logic circuit.

To facilitate understanding, it is assumed in this embodiment that the rotary encoder 10 outputs a sin wave and a cos wave in one cycle when the rotor serving as the moving body rotates once. The velocity detection device 100 periodically samples coordinates of the rotor in one cycle. The velocity detection device 100 acquires two-dimensional coordinates (Euclidean coordinates) (x1, y1) by a first sampling and also acquires two-dimensional coordinates (x2, y2) after certain time by a second sampling next to the first sampling. (x1 and x2 are sin values and y1 and y2 are cos values.) The velocity detection device 100 calculates an angle Φ between a position of the rotor during the first sampling and that during the second sampling based on the coordinates (x1, y1) and (x2, y2) using the CORDIC algorithm. Since sampling is carried out periodically, the velocity detection device 100 can acquire the angular velocity upon calculating this angle Φ.

The memory 52 stores therein a plurality of preset temporary angles $\Phi_0$ to $\Phi_n$ ($\Phi_0 > \Phi_1 > \Phi_2 \ldots \Phi_n$) (where n is a natural number) and trigonometric function values $\cos \Phi_0$ to $\cos \Phi_n$ and $\tan \Phi_0$ to $\tan \Phi_n$ corresponding to the temporary angles $\Phi_0$ to $\Phi_n$, respectively. In an initial state of the velocity detection device 100, the first to third registers R11 to R31 do not store specific values.

First, the processor 50 receives the first coordinates (x1, y1)=(sin θ, cos θ) of the rotor obtained by the first sampling in the form of digital values from the A/D converter 40. The first coordinates are stored in the second register R21.

Initially, the first register R11 and the third register R31 are undefined. A calculation value at this time is eliminated because the value is based on an undefined value.

Next, the processor 50 carries out the second sampling in a next cycle. The processor 50 receives the actual second coordinates (x2, y2)=(sin(θ+Φ), cos(θ+Φ)) of the rotor acquired by the second sampling in the form of digital values from the A/D converter 40. The second coordinates (sin(θ+Φ)), cos(θ+

Φ) are stored in the second register R21. At this moment, the first register R11 stores the first coordinates (sin θ, cos θ).

Figure 3:
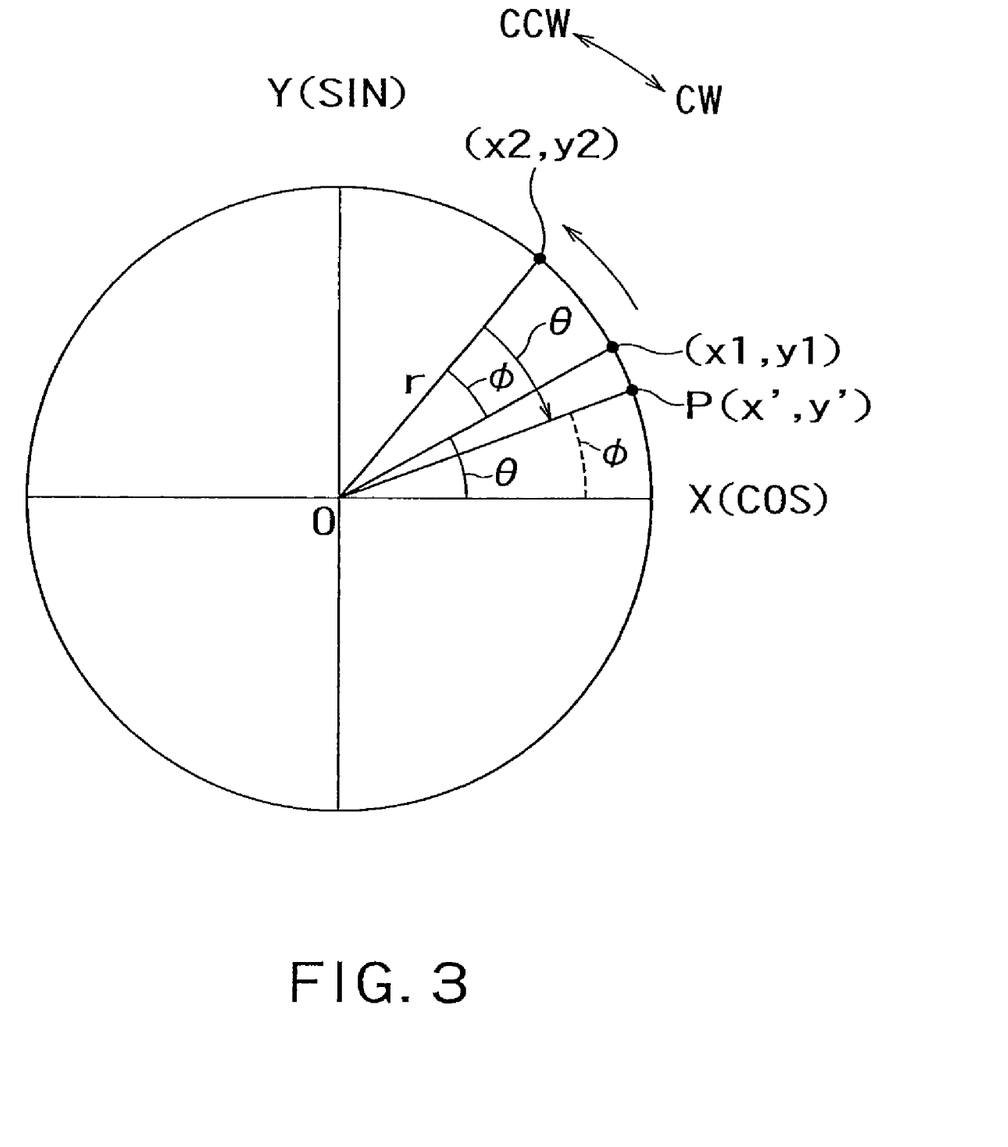
FIG. 3 is a chart showing concept of a first calculation made by the rotational direction discriminator 53.

FIG. 3 is a chart showing positional relationship between the first coordinates (sin θ, cos θ) and the actual second coordinates (sin(θ+Φ), cos(θ+Φ)) and concept of a first calculation made by the rotational direction discriminator 53. The actual second coordinates (sin(θ+Φ), cos(θ+Φ)) correspond to actual coordinates obtained when rotating the rotor on the first coordinates (sin θ, cos θ) by as much as Φ as shown in FIG. 3. Note that θ and Φ are in units of rad (radian). On a sheet of FIG. 3, the rotor rotates in a CCW (Counter Clock Wise) direction (an arrow direction in FIG. 3).

When the processor 50 receives the actual second coordinates, the third register R31 is undefined yet. Due to this, the selector 56 shown in FIG. 2 selects the first register R11 and transmits the first coordinates (sin θ, cos θ) to the rotational direction discriminator 53 and the CORDIC rotation 51. On the other hand, the second register R21 transmits the second coordinates (sin(θ+Φ), cos(θ+Φ)) to the rotational direction discriminator 53 and the CORDIC rotation 51.

The rotational direction discriminator 53 initially calculates temporary coordinates P(x', y') on a line connecting a point obtained by rotating the rotor on the actual second coordinates (sin(θ+Φ), cos(θ+Φ)) by a rotational angle θ in a direction of a coordinate axis X to an origin O while assuming that the origin O of coordinates is a center of rotation and that the rotational angle from the actual first coordinates (sin θ, cos θ) to the coordinate axis X is θ. In FIG. 3, a distance r from the origin O to the actual first coordinates is equal to a distance r from the origin O to the actual second coordinates. Therefore, the temporary coordinates P(x', y') are equal to a point obtained by rotating the rotor on the actual second coordinates by the rotational angle θ in the direction of the coordinate axis X.

The rotational direction discriminator 53 discriminates a rotational direction from the actual first coordinates to the actual second coordinates based on whether a sign of a coordinate y' in the temporary coordinates P(x', y') is plus or minus. For example, in the embodiment shown in FIG. 3, y' is a positive value, so that the rotational direction discriminator 53 discriminates that the rotor rotates in the CCW direction. Conversely, if y' is a negative value, the rotational direction discriminator 53 discriminates that the rotor rotates in a CW (Clockwise) direction.

Initially (at i=0), the rotational direction discriminator 53 calculates the temporary coordinates P(x', y') according to Equations (1) and (2). Derivation of the Equations (1) and (2) will be described later.

$$x' = x2 \cdot x1 + y2 \cdot y1 \quad \text{(Equation 1)}$$

$$y' = -x2 \cdot y1 + x1 \cdot y2 \quad \text{(Equation 2)}$$

Although being able to calculate both of x' and y', the rotational direction discriminator 53 does not necessarily calculate the both but can calculate only one of x' and y'. For example, in the specific example shown above, the rotational direction discriminator 53 discriminates the rotational direction of the rotor based on the sign of y'. Accordingly, it suffices that the rotational direction discriminator 53 makes the calculation using only the Equation (2).

The CORDIC rotation 51 calculates the calculational second coordinates ($xc_i$, $yc_i$) using the first coordinates (x1, y1)=(sin θ, cos θ) as well as the trigonometric function values $\cos θ_0$ to $\cos Φ_n$ and $\tan Φ_0$ to $\tan Φ_n$ from the memory 52. The calculational second coordinates ($xc_i$, $yc_i$) are coordinates calculated repeatedly so as to converge into the actual second coordinates (x2, y2) when the CORDIC rotation 51 calculates the angle Φ.

The third register R31 stores the calculational second coordinates ($xc_i$, $yc_i$) halfway along this calculation. The calculational second coordinates ($xc_i$, $yc_i$) can be expressed by Equations (3) or (4).

The rotational direction discriminator 53 selects either the Equations (3) or (4) based on, for example, the sign of y'. The CORDIC rotation 51 executes calculations expressed by the Equations (3) or (4) according to selection of the rotational direction discriminator 53.

$$xc_i = \cos Φ_i * (xc_{i-1} - yc_{i-1} * \tan Φ_i)$$

$$yc_i = \cos Φ_i * (yc_{i-1} + xc_{i-1} * \tan Φ_i) \quad \text{(Equation 3)}$$

or $$xc_i = \cos Φ_i * (xc_{i-1} + yc_{i-1} * \tan Φ_i)$$

$$yc_i = \cos Φ_i * (yc_{i-1} - xc_{i-1} * \tan Φ_i) \quad \text{(Equation 4)}$$

In the Equations (3) and (4), $Φ_1 = \tan^{-1} 2^{-i}$ (i=0, 1, 2, ... n), and $xc_{i-1} = x1$ and $yc_{i-1} = y1$ at i=0.

For example, if the sign of y' is plus, it is clear that the actual second coordinates shown in FIG. 3 are at a position obtained by rotating the rotor on the actual first coordinates about the origin O in the CCW direction. Therefore, the rotational direction discriminator 53 initially selects the Equations (4) so that the CORDIC rotation 51 can calculate the calculational second coordinates ($xc_i$, $yc_i$) obtained by moving the actual second coordinates in the CW direction.

The Equations (3) and (4) are explained below. First, the first coordinates and the actual second coordinates can be expressed by Equations (5) to (8), respectively.

$$x1 = \cos θ \quad \text{(Equation 5)}$$

$$y1 = \sin θ \quad \text{(Equation 6)}$$

$$x2 = \cos(θ+Φ) \quad \text{(Equation 7)}$$

$$y2 = \sin(θ+Φ) \quad \text{(Equation 8)}$$

The Equations (7) and (8) are transformed to Equations (9) and (10) using addition theorem of the trigonometric function, respectively.

$$x2 = \cos θ \cdot \cos Φ - \sin θ \cdot \sin Φ \quad \text{(Equation 9)}$$

$$y2 = \sin θ \cdot \cos Φ + \cos θ \cdot \sin Φ \quad \text{(Equation 10)}$$

If the Equations (5) and (6) are assigned to the Equations (9) and (10), the Equations (9) and (10) are transformed to Equations (11) and (12), respectively.

$$x2 = \cos Φ (x1 - y1 \cdot \tan Φ) \quad \text{(Equation 11)}$$

$$y2 = \cos Φ (y1 + x1 \cdot \tan Φ) \quad \text{(Equation 12)}$$

At this time, the CORDIC algorithm is introduced. More specifically, a value of tan Φ is limited to $-2^{-i}$ or $+2^{-i}$ as shown in the Equation (11). The tang thus limited is defined as $\tan Φ_i$.

$$\tan Φ_i = \pm 2^{-i} = \pm 1, \pm 2^{-1}, \pm 2^{-2}, \ldots (i=0, 1, 2, \ldots n) \quad \text{(Equation 13)}$$

At this time, a possible value of $Φ_i$ is limited as expressed by the Equation (12). This angle $Φ_i$ is a discrete numerical value and referred to as "temporary angle $Φ_i$" hereinafter.

$$Φ_i = \tan^{-1}(\pm 2^{-i}) = \pm 0.78 rad, \pm 0.46 rad, \pm 0.25 rad, \pm 0.12 rad \quad \text{(Equation 14)}$$

Furthermore, if tan $\Phi_i$ is decided as expressed by the Equation (11), cos $\Phi_i$ is spontaneously decided as expressed by Equation (15).

$$\cos\theta_i = \cos(\tan^{-1}(\pm 2^{-i})) = 0.71, 0.89, 0.97, 0.99 \quad \text{(Equation 15)}$$

If the temporary angle $\Phi_i$ is assigned to the Equations (11) and (12), the calculational second coordinates are obtained. Note that the Equation (1) is satisfied if the temporary angle $\Phi_i$ is positive and the Equation (2) is satisfied if the temporary angle $\Phi_i$ is negative.

Discrete numerical values for each i shown in the Equations (13) to (15) are set in advance and stored in the memory 52. That is, the memory 52 stores the temporary angle $\Phi_i$ and the trigonometric function values tan $\Phi_i$ and cos $\Phi_i$ corresponding to the temporary angle $\Phi_i$ for each i. The CORDIC rotation 51 acquires the temporary angle $\Phi_i$ based on the Equation (3) or (4) while referring to the numerical values stored in the memory 52 and shown in the Equations (13) to (15).

The CORDIC rotation 51 calculates the calculational second coordinates (xc$_i$, yc$_i$) shown in the Equation (3) or (4) for each i in order of i=0, 1, 2, . . . .

Figure 4A:
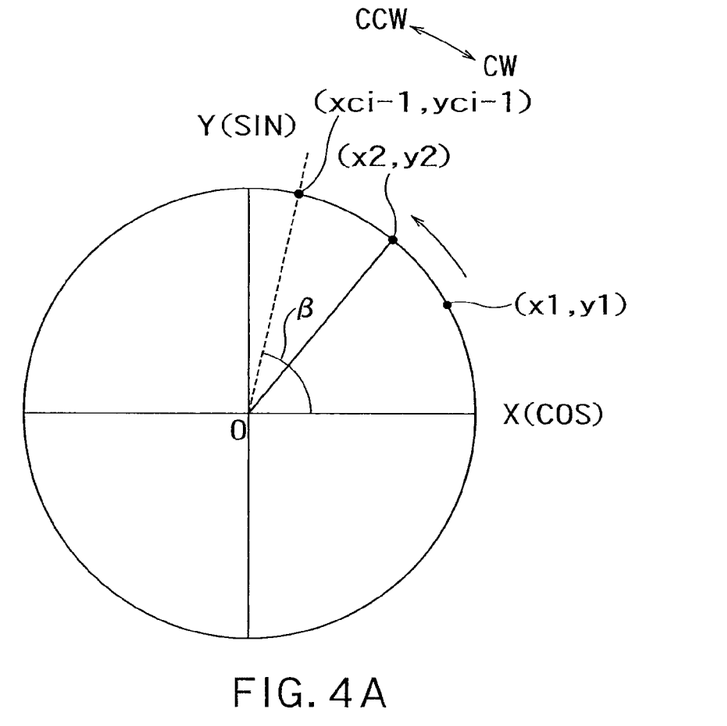
FIGS. 4A and 4B are charts showing concept of calculations after the initial calculation made by the rotational direction discriminator 53.
Figure 4B:
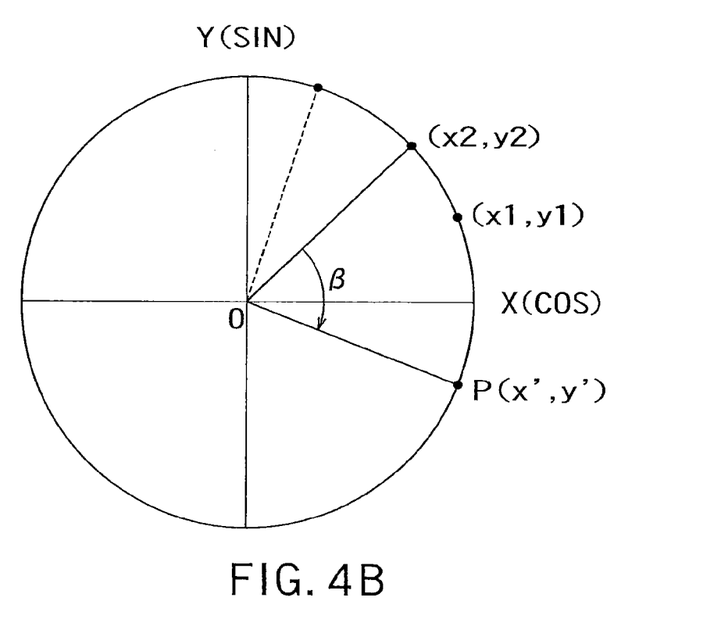

FIGS. 4A and 4B are charts showing positional relationship between the actual second coordinates and the calculational second coordinates and concept of calculations after the initial calculation made by the rotational direction discriminator 53.

After the initial calculation (i≧1), the rotational direction discriminator 53 discriminates a rotational direction of the rotor from the calculational second coordinates (xc$_{i-1}$, yc$_{i-1}$) to the actual second coordinates (x2, y2) using the calculational second coordinates (xc$_{i-1}$, yc$_{i-1}$) and the actual second coordinates (x2, y2). More specifically, if it is assumed that the origin O shown in FIG. 4A is a center of rotation and a rotational angle from the calculational second coordinates (xc$_{i-1}$, yc$_{i-1}$) to the coordinate axis X is β, the rotational direction discriminator 53 calculates at least either x' or y' in temporary coordinates P(x', y') on a line connecting a point obtained by rotating the rotor on the actual second coordinate (x2, y2) by the rotational angle β in a direction of the coordinate axis X to the origin O. In FIGS. 4A and 4B, a distance r from the origin O to the actual second coordinates (x2, y2) is equal to a distance r from the origin O to the calculational second coordinates (xc$_{i-1}$, yc$_{i-1}$). Therefore, the temporary coordinates P(x', y') are equal to a point obtained by rotating the rotor on the actual second coordinates (x2, y2) by the rotational angle β in the direction of the coordinate axis X.

The rotational direction discriminator 53 discriminates the rotational direction from the Calculational second coordinates (xc$_{i-1}$, yc$_{i-1}$) to the actual second coordinates (x2, y2) based on whether the sign of the coordinate y' in the temporary coordinates P(x', y') is plus or minus. For example, in the embodiment shown in FIG. 4B, y' is a negative value, so that the rotational direction discriminator 53 discriminates that the rotor rotates in the CW direction from the calculational second coordinates to the actual second coordinates. Conversely, if y' is a positive value, the rotational direction discriminator 53 discriminates that the rotor rotates in the CCW direction.

After the initial calculation (i≧1), the temporary coordinates P(x', y') are calculated according to Equations (16) and (17).

$$x' = xc_{i-1} \cdot x1 + yc_{i-1} \cdot y1 \quad \text{(Equation 16)}$$

$$y' = -xc_{i-1} \cdot y1 + x1 \cdot yc_{i-1} \quad \text{(Equation 17)}$$

Although being able to calculate both of x' and y', the rotational direction discriminator 53 does not necessarily calculate the both but can calculate only one of x' and y'. For example, in the specific example shown above, the rotational direction discriminator 53 discriminates the rotational direction from the calculational second coordinates to the actual second coordinates according to the sign of y'. Accordingly, it suffices that the rotational direction discriminator 53 makes the calculation using only the Equation (2).

The CORDIC rotation 51 makes calculations as expressed by the Equations (3) or (4) so as to make the calculational second coordinates (xc$_i$, yc$_i$) closer to the second coordinates (x2, y2). To move the calculational second coordinates (xc$_i$, yc$_i$) in the CCW direction, the CORDIC rotation 51 uses the Equations (3). To move the calculational second coordinates (xc$_i$, yc$_i$) in the CW direction, the CORDIC rotation 51 uses the Equations (4).

After the initial calculation, the rotational direction discriminator 53 repeatedly executes calculations expressed by the Equation (16) or (17) and the CORDIC rotation 51 repeatedly executes calculations expressed by the Equations (3) or (4) whenever the calculational second coordinates are updated. As a result, it is possible to make the calculational second coordinates (xc$_i$, yc$_i$) converge into the actual second coordinates (x2, y2) as shown in FIG. 5.

In the process of the convergence calculations, an angle obtained by adding up the temporary angles $+\Phi_i$ or $-\Phi_i$ becomes the rotational angle to be obtained.

Figure 5:
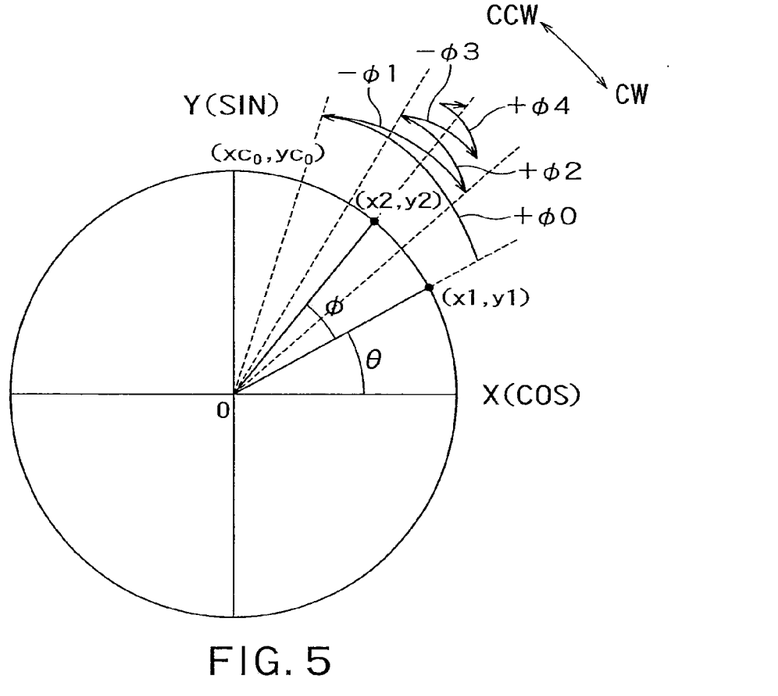
FIG. 5 is a conceptual diagram for making the calculational second coordinates ($xc_i$, $yc_i$) converge into the actual second coordinates (x2, y2)

FIG. 5 is a conceptual diagram for making the calculational second coordinates (xc$_i$, yc$_i$) converge into the actual second coordinates (x2, y2). First, the CORDIC rotation 51 transforms the first coordinates (x1, y1) to (xc$_{i-1}$, yc$_{i-1}$) and assigns values of the Equations (13) to (15) at i=0 to the Equation (3), thereby obtaining the second coordinates (xc$_0$, yc$_0$). At this time, the selector 56 shown in FIG. 2 selects the first register R11 and transmits the first coordinates (x1, y1) to the CORDIC rotation 51 and the rotational direction discriminator 53. The calculational second coordinates (xc$_0$, yc$_0$) are coordinates obtained by rotating the rotor on the first coordinates (x1, y1) toward the second coordinates (x2, y2) by $\Phi_0$ in the CCW direction. After the calculation, the third register R31 shown in FIG. 2 holds the calculational second coordinates (xc$_0$, yc$_0$). Note that the rotational angle holding register R41 stores the initial temporary angle $+\Phi_0$ or $-\Phi_0$.

Next, the CORDIC rotation 51 assigns the calculational second coordinates (xc$_0$, yc$_0$) and values of the Equations (13) to (15) at i=1 to the Equation (4), thereby obtaining the second coordinates (xc$_i$, yc$_i$). At this time, the selector 56 shown in FIG. 2 selects the third register R31 and transmits the calculational second coordinates (xc$_0$, yc$_0$) to the CORDIC rotation 51 and the rotational direction discriminator 53. The CORDIC rotation 51 uses the Equations (4). A method by which the rotational direction discriminator 53 selects the Equations (4) is the same as that described above.

The calculational second coordinates (xc$_1$, yc$_1$) are coordinates obtained by rotating the rotor on the calculational second coordinates (xc$_0$, yc$_0$) toward the actual second coordinates (x2, y2) by $\Phi_1$ in the CW direction. At this time, the adder 80 adds the temporary angle $+\Phi_1$ or $-\Phi_1$ to the temporary angle $+\Phi_0$ or $-\Phi_0$ stored in the rotational angle holding register R41, and returns this addition result to the rotational angle holding register R41

The CORDIC rotation 51 repeatedly makes similar calculations for i=3, 4, . . . . As shown in the Equation (14), a value of the temporary angle $\Phi_i$ become lower as i is greater. Accordingly, the calculational second coordinates (xc$_i$, yc$_i$) converge into the actual second coordinates (x2, y2). At this time, the third register R31 stores the calculational second coordinates (xc$_i$, yc$_i$) and the selector 56 transmits the calculational second coordinates ($xc_i$, $yc_i$) to the CORDIC rotation 51 and the rotational direction discriminator 53 when next calculational second coordinates ($xc_{i+1}$, $yc_{i+1}$) are to be calculated.

The adder 80 adds the temporary angle $+\Phi_i$ or $-\Phi_i$ to temporary angle $+\Phi_{i-1}$ or $-\Phi_{i-1}$ stored in the rotational angle holding register R41, and returns the addition result to the rotational angle holding register R41. In this way, the adder 80 adds up temporary angles $+\Phi_0$ or $-\Phi_0$, $+\Phi_1$ or $-\Phi_1$, $+\Phi_2$ or $-\Phi_2$, . . . and $+\Phi_i$ or $-\Phi_i$, and the rotational angle holding register R41 holds the resultant temporary angle. When the temporary angle $\Phi_i$ converges, the angle stored in the rotational angle holding register R1 becomes the rotational angle $\Phi$ from the actual first coordinates to the second coordinates.

A series of calculations are made during a period from second to third samplings. That is, the CORDIC rotation 51 converges the calculational second coordinates ($xc_i$, $yc_i$) into the actual second coordinates (x2, y2) during a one-cycle period. As a result, it is possible to obtain the rotational angle $\Phi$ from the actual first coordinates to the second coordinates.

By doing so, the CORDIC rotation 51 can obtain the actual rotational angle $\Phi$ by every sampling. The one-cycle sampling period is a preset period. Accordingly, the velocity detection device 100 can obtain the angular velocity by the temporary angle $\Phi_i$ equal to or closer to the actual angle $\theta+\Phi$ obtained by each sampling. The velocity detection device 100 outputs this angular velocity.

In the present embodiment, the actual second coordinates are rotationally moved by as much as the rotational angle ($\theta$ or $\beta$) between the actual first coordinates or calculational second coordinates and the X axis. This enables the rotational direction discriminator 53 to accurately discriminate whether the actual first coordinates or calculational second coordinates are in the CW direction or the CCW direction relative to the actual second coordinates.

Even if the distance from the origin O to the actual first coordinates differs from the distance from the origin O to the actual second coordinates, the rotational direction discriminator 53 can similarly and accurately discriminate the positional relationship between the actual first coordinates or calculational second coordinates and the actual second coordinates.

Figure 6:
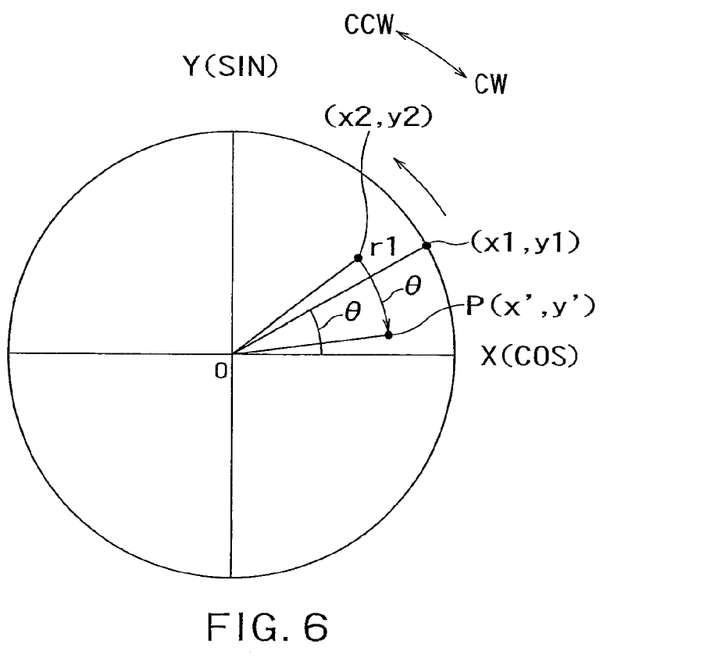
FIG. 6 is a conceptual diagram of a calculation for the rotational direction in a case that a ripple or noise that occurs to a power supply voltage.

For example, in actual operations, a ripple or noise that occurs to a power supply voltage often causes a fluctuation in the SIN signal and the COS signal. In this case, the distance from the origin O to the actual first coordinates differs from that from the origin O to the actual second coordinates as shown in FIG. 6. In this case, y2 is smaller than y1 despite rotation of the rotor in the CCW direction. Accordingly, if the rotational direction discriminator 53 is to discriminate the rotational direction of the rotor simply from a magnitude relationship between y1 and y2, the rotational direction discriminator 53 possibly erroneously discriminates the rotational direction of the rotor.

However, according to the present embodiment, y' in the temporary coordinates P is a positive value as shown in FIG. 6, so that the rotational direction discriminator 53 can discriminate that the actual second coordinates are in the CCW direction relative to the actual first coordinates. That is, according to the present embodiment, even if a ripple or noise occurs to the power supply voltage, the rotational direction discriminator 53 can accurately discriminate the positional relationship between the actual first coordinates and the actual second coordinates. The same thing is true for the positional relationship between the calculational second coordinates and the actual second coordinates.

Even if the distance from the origin O to the actual first coordinates differs from that from the origin O to the actual second coordinates, the Equations (1) and (2) and the Equations (13) and (14) are applicable to discrimination of the rotational direction. For example, the relationship between the actual second coordinates (x2, y2) and the temporary coordinates P shown in FIG. 6 is expressed by the following Equation (18).

$$\begin{pmatrix} x' \\ y' \end{pmatrix} = \begin{pmatrix} \cos\theta & \sin\theta \\ -\sin\theta & \cos\theta \end{pmatrix} \begin{pmatrix} x2 \\ y2 \end{pmatrix} \quad \text{(Equation 18)}$$

$$\cos\theta = x1/r1 \quad \text{(Equation 20)}$$

$$\sin\theta = y1/r1 \quad \text{(Equation 21)}$$

Equations (22) and (23) are derived from the Equations (18) to (21).

$$x' = (1/r1)\cdot(x2\cdot x1 + y2\cdot y1) \quad \text{(Equation 22)}$$

$$y' = (1/r1)\cdot(-x2\cdot y1 + x1\cdot y2) \quad \text{(Equation 23)}$$

Since a distance r1 from the origin O to the actual first coordinates (x1, y1) is constantly positive, signs of x' and y' are decided based on the Equation (2) irrespectively of the distance r1.

The rotational direction discriminator 53 according to the present embodiment described above discriminates the positional relationship between the actual first coordinates or the calculational second coordinates and the actual second coordinates relatively to the X axis. Needless to say, the rotational direction discriminator 53 can discriminate the positional relationship relatively to the Y axis. In this case, the rotational direction discriminator 53 discriminates the positional relationship between the actual first coordinates or calculational second coordinates and the actual second coordinates based on whether the sign of x' in the Equation (2) is plus or minus. That is, it suffices that the rotational direction discriminator 53 makes the calculation according only to the Equation (2) and selects the Equations (3) or (4) according to the sign of x' obtained by the calculation. Since an operation performed by the rotational direction discriminator 53 relatively to the Y axis can be easily estimated from this embodiment, explanations thereof will be omitted.

In the present embodiment, the velocity detection device 100 calculates the angular velocity of the rotor. Alternatively, the velocity detection device 100 is applicable to a moving body making a reciprocating motion. In this alternative, the velocity detection device 100 can detect an angular velocity calculated by the CORDIC rotation 51 as a velocity of the moving body.

According to the present embodiment, the velocity detection device 100 can detect the rotational angle using only the sin signal and the cos signal without using the division (arc tangent) that deteriorates accuracy of velocity detection. Therefore, it is possible to ensure that the velocity detection device 100 has high accuracy.

According to the present embodiment, the velocity detection device 100 makes calculations so as to make the calculational second coordinates closer to the actual second coordinates using one of four arithmetic operations except for division, that is, multiplication, addition or subtraction as expressed by the Equations (3) and (4). It is thereby possible to make the arithmetic circuit in the velocity detection device 100 relatively simple in configuration. This can make the entire device 100 smaller in size and appropriate for mass-production.

The invention claimed is:

1. A velocity detection device for periodically sampling coordinates indicating a position of a moving body making a rotational motion or a reciprocating motion, and for detecting a velocity of the moving body based on the coordinates, comprising:
   a memory storing a plurality of preset temporary angles and trigonometric function values corresponding to the temporary angles, respectively;
   a first register storing actual first coordinates of the moving body, the actual first coordinates being obtained by a first sampling;
   a second register storing actual second coordinates of the moving body, the actual second coordinates being obtained by a second sampling next to the first sampling;
   a rotational direction discriminator calculating at least either an x coordinate or a y coordinate in temporary coordinates on a line, which connects between an origin of the coordinates and a point obtained by rotating the actual second coordinates by as much as a rotational angle θ in a direction of a coordinate axis, the rotational direction discriminator discriminating a rotational direction from the actual first coordinates to the actual second coordinates based on either a sign of the x coordinate in the temporary coordinates or a sign of the y coordinate in the temporary coordinates, the origin of the coordinates being a center of rotation, and the θ being the rotational angle from the actual first coordinates to the coordinate axis; and
   a processor calculating calculational second coordinates represented by multiplication, addition or subtraction between the actual first coordinates and one of the trigonometric function values in order to make the calculational second coordinates closer to the actual second coordinates based on the rotational direction, the processor calculating the velocity of the moving body based on one of the temporary angles corresponding to the trigonometric function value used for the calculational second coordinates, wherein:
   the rotational direction discriminator calculates at least either an x coordinate or a y coordinate in temporary coordinates on a line, which connects between the origin of the coordinates and a point obtained by rotating the actual second coordinates by as much as a rotational angle β in the direction of the coordinate axis,
   the rotational direction discriminator discriminates a rotational direction from the calculational second coordinates to the actual second coordinates based on either a sign of the x coordinate in the temporary coordinates or a sign of the y coordinate in the temporary coordinates,
   the origin of the coordinates is the center of rotation,
   the β is the rotational angle from the calculational second coordinates to the coordinate axis,
   the memory stores $\Phi_0$ to $\Phi_n$, where $\Phi_0 > \Phi_1 > \Phi_2 \ldots \Phi_n$, n is a natural number and $\Phi_0$ to $\Phi_n$ are the temporary angles, the memory storing $\cos \Phi_0$ to $\cos \Phi_n$ and $\tan \Phi_0$ to $\tan \Phi_n$ as the trigonometric function values,
   the processor repeatedly calculates Equations (3) or (4), where $\Phi_i = \tan^{-1} 2^{-i}$ and i=0, 1, 2, ... n, and $xc_{i-1} = x1$ and $yc_{i-1} = y1$ at i=0, wherein the first coordinates are (x1, y1), the actual second coordinates are (x2, y2), and the calculational second coordinates are ($xc_i$, $yc_i$):

$$xc_i = \cos \Phi_i * (xc_{i-1} - yc_{i-1} * \tan \Phi_i)$$

$$yc_i = \cos \Phi_i * (yc_{i-1} + xc_{i-1} * \tan \Phi_i) \quad \text{(Equation 3)}$$

or $$xc_i = \cos \Phi_i * (xc_{i-1} + yc_{i-1} * \tan \Phi_i)$$

$$yc_i = \cos \Phi_i * (yc_{i-1} - xc_{i-1} * \tan \Phi_i) \quad \text{(Equation 4)},$$

the rotational direction discriminator:
calculates the temporary coordinates (x', y') by calculating Equation 1 or 2 at i=0

$$x' = x2 \cdot x1 + y2 \cdot y1 \quad \text{(Equation 1)}$$

$$y' = -x2 \cdot y1 + x1 \cdot y2 \quad \text{(Equation 2)},$$

discriminates a rotational direction from the actual first coordinates to the actual second coordinates based on whether a sign of the x' or a sign of the y' is plus or minus, and
selects either the Equations (3) or (4) according to the rotational direction, and
the rotational direction discriminator also:
calculates the temporary coordinates (x', y') by calculating Equation 16 or 17 at i≧1:

$$x' = x2 \cdot xc_{i-1} + y2 \cdot yc_{i-1} \quad \text{(Equation 16)}$$

$$y' = -x2 \cdot yc_{i-1} + xc_{i-1} \cdot y2 \quad \text{(Equation 17)},$$

discriminates a rotational direction from the calculational second coordinates to the actual second coordinates based on whether the sign of the x' or the sign of the y' is plus or minus, and
selects either the Equations (3) or (4) according to the rotational direction.

2. The velocity detection device of claim 1, wherein the processor calculates the calculational second coordinates ($xc_i$, $yc_i$) for each i in order of i=0, 1, 2, ... using the Equations (3) or (4) selected by the rotational direction discriminator, and calculates the velocity of the moving body based on the temporary angle used for the calculational second coordinates closest to the actual second coordinates.

3. The velocity detection device of claim 1, further comprising:
   a third register sequentially holding the calculational second coordinates; and
   a fourth register for adding up the temporary angles.

4. A servo motor for periodically sampling coordinates indicating a position of a moving body making a rotational motion or a reciprocating motion, and for detecting a velocity of the moving body based on the coordinates, comprising:
   a memory storing a plurality of preset temporary angles and trigonometric function values corresponding to the temporary angles, respectively;
   a first register storing actual first coordinates of the moving body, the actual first coordinates being obtained by a first sampling;
   a second register storing actual second coordinates of the moving body, the actual second coordinates being obtained by a second sampling next to the first sampling;
   a rotational direction discriminator calculating at least either an x coordinate or a y coordinate in temporary coordinates on a line, which connects between an origin of the coordinates and a point obtained by rotating the actual second coordinates by as much as a rotational angle θ in a direction of a coordinate axis, the rotational direction discriminator discriminating a rotational direction from the actual first coordinates to the actual second coordinates based on either a sign of the x coordinate in the temporary coordinates or a sign of the y coordinate in the temporary coordinates, the origin of the coordinates being a center of rotation, and the θ being the rotational angle from the actual first coordinates to the coordinate axis; and a processor calculating calculational second coordinates represented by multiplication, addition or subtraction between the actual first coordinates and one of the trigonometric function values in order to make the calculational second coordinates closer to the actual second coordinates based on the rotational direction, the processor calculating the velocity of the moving body based on one of the temporary angles corresponding to the trigonometric function value used for the calculational second coordinates, wherein:

the rotational direction discriminator calculates at least either an x coordinate or a y coordinate in temporary coordinates on a line, which connects between the origin of the coordinates and a point obtained by rotating the actual second coordinates by as much as a rotational angle β in the direction of the coordinate axis, the rotational direction discriminator discriminates a rotational direction from the calculational second coordinates to the actual second coordinates based on either a sign of the x coordinate in the temporary coordinates or a sign of the y coordinate in the temporary coordinates, the origin of the coordinates is the center of rotation, the β is the rotational angle from the calculational second coordinates to the coordinate axis, the memory stores $\Phi_0$ to $\Phi_n$, where $\Phi_0 > \Phi_1 > \Phi_2 \ldots \Phi_n$, n is a natural number and $\Phi_0$ to $\Phi_n$ are the temporary angles, the memory storing $\cos \Phi_0$ to $\cos \Phi_n$ and $\tan \Phi_0$ to $\tan \Phi_n$ as the trigonometric function values, the processor repeatedly calculates Equations (3) or (4), where $\Phi_i = \tan^{-1} 2^{-i}$ and $i=0, 1, 2, \ldots n$, and $xc_{i-1} = x1$ and $yc_{i-1} = y1$ at $i=0$, wherein the first coordinates are (x1, y1), the actual second coordinates are (x2, y2), and the calculational second coordinates are ($xc_i$, $yc_i$):

$$xc_i = \cos \Phi_i * (xc_{i-1} - yc_{i-1} * \tan \Phi_i)$$

$$yc_i = \cos \Phi_i * (yc_{i-1} + xc_{i-1} * \tan \Phi_i) \quad \text{(Equation 3)}$$

or $$xc_i = \cos \Phi_i * (xc_{i-1} + yc_{i-1} * \tan \Phi_i)$$

$$yc_i = \cos \Phi_i * (yc_{i-1} - xc_{i-1} * \tan \Phi_i) \quad \text{(Equation 4)},$$

the rotational direction discriminator:

calculates the temporary coordinates (x', y') by calculating Equation 1 or 2 at i=0

$$x' = x2 \cdot x1 + y2 \cdot y1 \quad \text{(Equation 1)}$$

$$y' = -x2 \cdot y1 + x1 \cdot y2 \quad \text{(Equation 2)},$$

discriminates a rotational direction from the actual first coordinates to the actual second coordinates based on whether a sign of the x' or a sign of the y' is plus or minus, and selects either the Equations (3) or (4) according to the rotational direction, and the rotational direction discriminator also:

calculates the temporary coordinates (x', y') by calculating Equation 16 or 17 at $$x' = x2 \cdot xc_{i-1} + y2 \cdot yc_{i-1} \quad \text{(Equation 16)}$$

$$y' = -x2 \cdot yc_{i-1} + xc_{i-1} \cdot y2 \quad \text{(Equation 17)},$$

discriminates a rotational direction from the calculational second coordinates to the actual second coordinates based on whether the sign of the x' or the sign of the y' is plus or minus, and selects either the Equations (3) or (4) according to the rotational direction.

5. The servo motor of claim 4, wherein the processor calculates the calculational second coordinates ($xc_i$, $yc_i$) for each i in order of i=0, 1, 2, . . . using the Equations (3) or (4) selected by the rotational direction discriminator, and calculates the velocity of the moving body based on the temporary angle used for the calculational second coordinates closest to the actual second coordinates.

6. The servo motor of claim 4, further comprising:

a third register sequentially holding the calculational second coordinates; and a fourth register for adding up the temporary angles.

* * * * *